United States Patent
Fischer et al.

(10) Patent No.: US 7,934,076 B2
(45) Date of Patent: Apr. 26, 2011

(54) SYSTEM AND METHOD FOR LIMITING EXPOSURE OF HARDWARE FAILURE INFORMATION FOR A SECURED EXECUTION ENVIRONMENT

(75) Inventors: Stephen A. Fischer, Gold River, CA (US); Shamanna M. Datta, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1286 days.

(21) Appl. No.: 10/956,322

(22) Filed: Sep. 30, 2004

(65) Prior Publication Data

US 2006/0075312 A1    Apr. 6, 2006

(51) Int. Cl.
*G06F 9/00* (2006.01)
(52) U.S. Cl. .................................................. 712/200
(58) Field of Classification Search ............... 714/48; 712/200
See application file for complete search history.

(56) References Cited

U.S. PATENT DOCUMENTS

| | | | | |
|---|---|---|---|---|
| 7,117,284 | B2 * | 10/2006 | Watt et al. | 710/261 |
| 7,340,573 | B2 * | 3/2008 | Watt | 711/163 |
| 7,546,642 | B2 * | 6/2009 | Williams | 726/30 |
| 2003/0229794 | A1 | 12/2003 | Sutton, II et al. | |

OTHER PUBLICATIONS

Intel Corporation, *IA-32 Intel® Architecture Software Developer's Manual*—vol. 3: *System Programming Guide*, Order No. 253668, pp. 14-1 to 14-21, 2004.
Intel Corporation, *Intel® Pentium® 4 Processor in the 478-Pin Package at 1.40 GHz, 1.50 GHz, 1.60GHz, 1.70GHz, 1.80 GHz, 1.90 GHz, and 2 GHz*, product datasheet, Order No. 249887-003, pp. 69-76, Apr. 2002.
Shanley, T., *Pentium Pro and Pentium II System Architecture*, Second Edition, Addison Wesley, ISBN 0-201-30973-4, pp. 477-497, Dec. 1997.

* cited by examiner

*Primary Examiner* — Alford W Kindred
*Assistant Examiner* — Benjamin P Geib
(74) *Attorney, Agent, or Firm* — Thomas R. Lane

(57) ABSTRACT

A method and apparatus for limiting the exposure of hardware failure information is described. In one embodiment, an error reporting system of a processor may log various status and error address data into registers that retain their contents through a warm reset event. But the error reporting system of the processor may then determine whether the processor is operating in a trusted or secure mode. If not, then the processor's architectural state variables may also be logged into registers. But if the processor is operating in a trusted or secure mode, then the logging of the architectural state variables may be inhibited, or flagged as invalid.

34 Claims, 7 Drawing Sheets

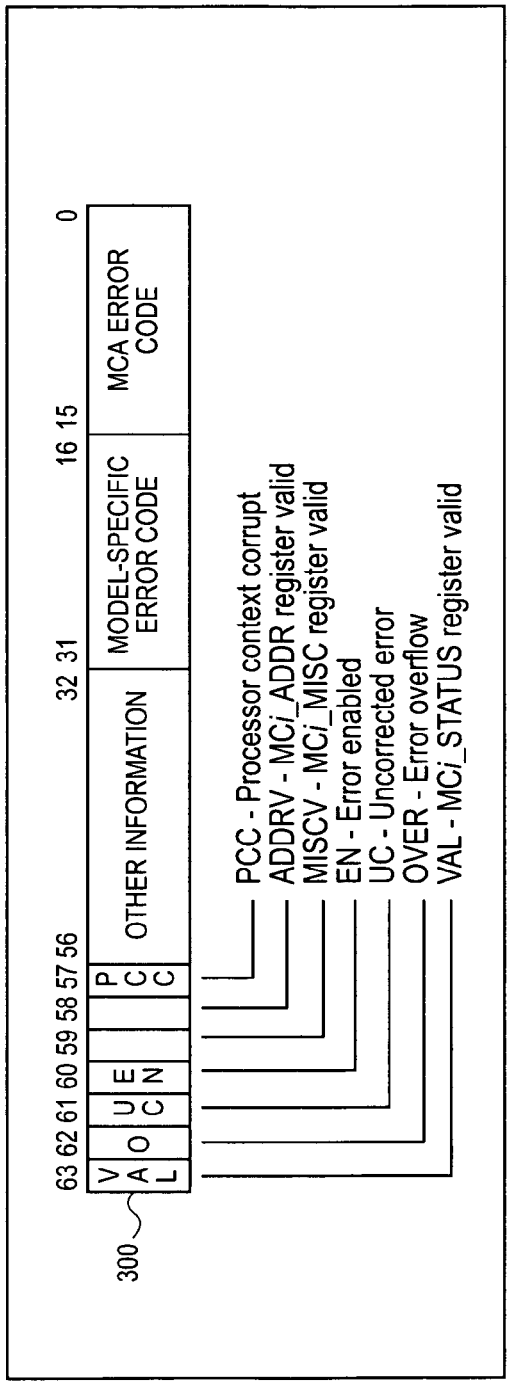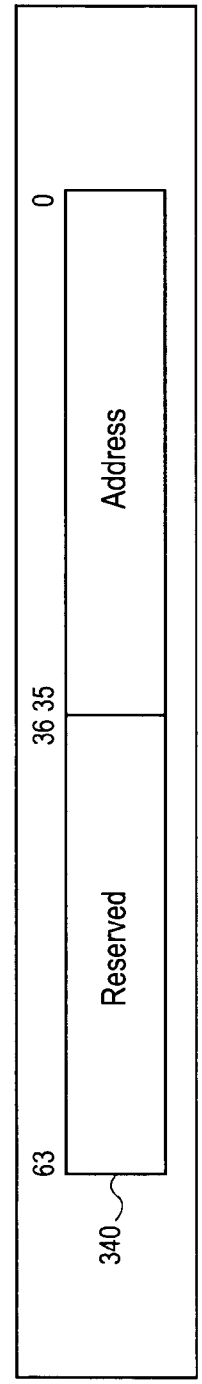
FIG. 3A
FIG. 3B

| MSR | Address | Description |
|---|---|---|
| IA32_MCG_EAX | 180H | State of the EAX register at the time of the machine-check error. |
| IA32_MCG_EBX | 181H | State of the EBX register at the time of the machine-check error. |
| IA32_MCG_ECX | 182H | State of the ECX register at the time of the machine-check error. |
| IA32_MCG_EDX | 183H | State of the EDX register at the time of the machine-check error. |
| IA32_MCG_ESI | 184H | State of the ESI register at the time of the machine-check error. |
| IA32_MCG_EDI | 185H | State of the EDI register at the time of the machine-check error. |
| IA32_MCG_EBP | 186H | State of the EBP register at the time of the machine-check error. |
| IA32_MCG_ESP | 187H | State of the ESP register at the time of the machine-check error. |
| IA32_MCG_EFLAGS | 188H | State of the EFLAGS register at the time of the machine-check error. |
| IA32_MCG_EIP | 189H | State of the EIP register at the time of the machine-check error. |
| IA32_MCG_MISC | 18AH | When set, indicates that a page assist or page fault occurred during DS normal operation. |

FIG. 4

SYSTEM AND METHOD FOR LIMITING EXPOSURE OF HARDWARE FAILURE INFORMATION FOR A SECURED EXECUTION ENVIRONMENT

FIELD

The present invention relates generally to microprocessor systems, and more specifically to microprocessor systems that may operate in a trusted or secured environment.

BACKGROUND

The increasing number of financial and personal transactions being performed on local or remote microcomputers has given impetus for the establishment of "trusted" or "secured" microprocessor environments. The problem these environments try to solve is that of loss of privacy, or data being corrupted or abused. Users do not want their private data made public. They also do not want their data altered or used in inappropriate transactions. Examples of these include unintentional release of medical records or electronic theft of funds from an on-line bank or other depository. Similarly, content providers seek to protect digital content (for example, music, other audio, video, or other types of data in general) from being copied without authorization.

A system that may operate from time to time in either a trusted or an untrusted mode, or both simultaneously, may encounter a security issue with certain error reporting implementations. For example, in the Pentium®-compatible architecture a hardware error reporting system, called a machine-check architecture (MCA), is provided. The MCA may provide a mechanism for detecting and reporting hardware errors, such as system bus errors, error-correcting code (ECC) errors, parity errors, cache errors, and translation look-aside buffer (TLB) errors. The MCA may include a number of MCA-supporting registers that may be used for recording information about errors that may be detected. The MCA registers may have potential security sensitive information written to them in the event of a hardware failure during operation in a trusted mode. To better support the subsequent execution of diagnostic software, the contents of these MCA registers may survive across a processor reset event.

In some processor embodiments, there may be an internal debug flag that may influence access to yet further hardware test and debug hooks. For example, if the internal debug flag is set, access may be granted to internal processor node states that would not be available during normal processor operation. This flag may be set during manufacturing and final test, and cleared during preparation for delivery to an end user. In other embodiments, other control methods for the internal debug flag may be implemented.

BRIEF DESCRIPTION OF THE DRAWINGS

The present disclosure is illustrated by way of example, and not by way of limitation, in the figures of the accompanying drawings and in which like reference numerals refer to similar elements and in which:

FIG. 3A is a diagram of a machine-check architecture status register, according to one embodiment of the present disclosure.

FIG. 3B is a diagram of a machine-check architecture address register, according to one embodiment of the present disclosure.

FIG. 4 is a diagram of a set of machine-check architecture state registers, according to one embodiment of the present disclosure.

DETAILED DESCRIPTION

The following description describes techniques for limiting the exposure of hardware failure information collected by an error reporting system during secure or trusted mode operation of a processor system. In the following description, numerous specific details such as logic implementations, software module allocation, bus and other interface signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. In certain embodiments, the invention is disclosed in the form of the machine-check architecture (MCA) implemented in Pentium® compatible processors such as those produced by Intel® Corporation. However, the invention may be practiced in other kinds of error reporting systems of other kinds of processors, such as an Itanium Processor Family compatible processor, an X-Scale® family compatible processor, or any of a wide variety of different general-purpose processors from any of the processor architectures of other vendors or designers. Additionally, some embodiments may include or may be special purpose processors, such as graphics, network, image, communications, or any other known or otherwise available type of processor.

Figure 1:
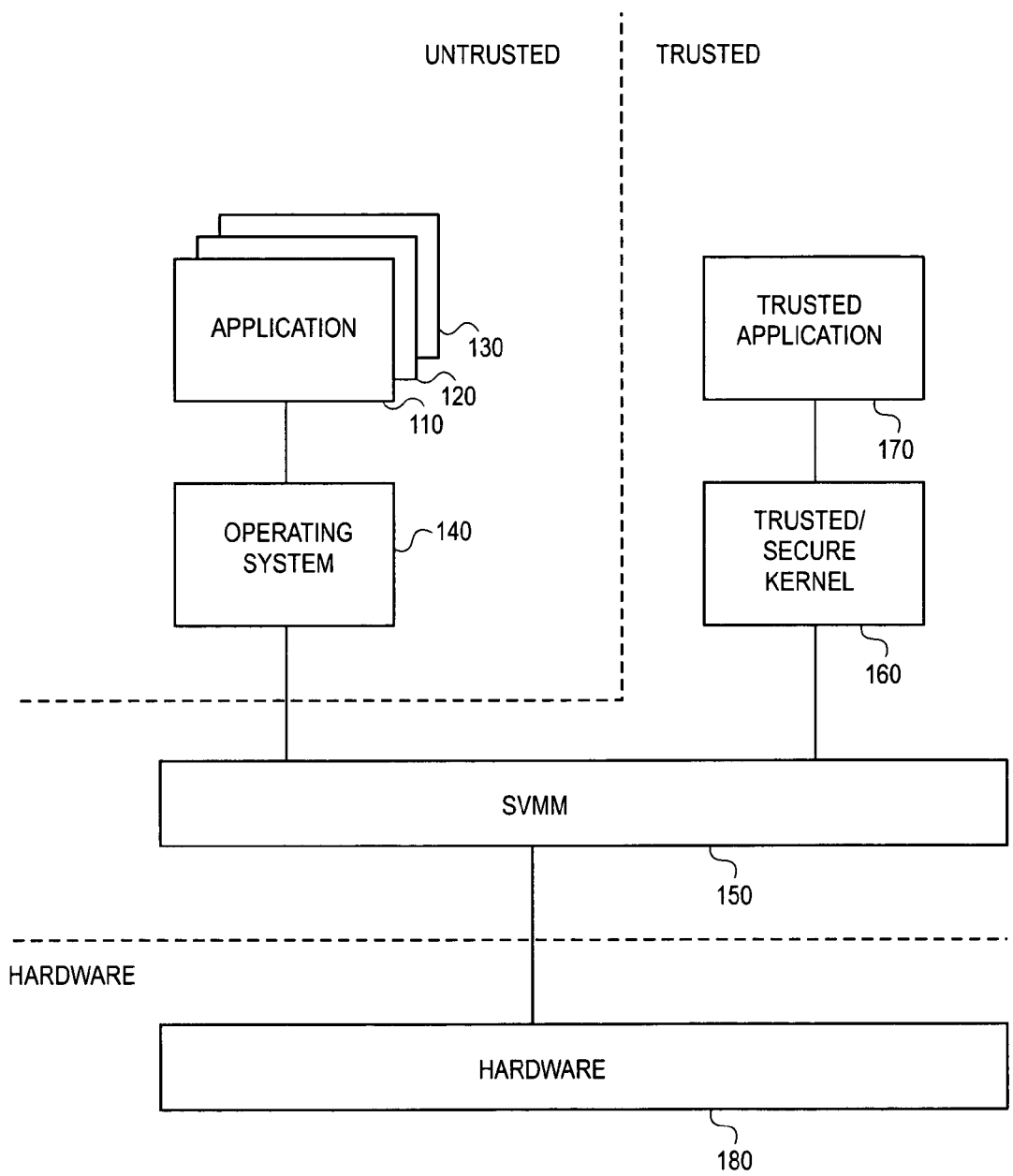
FIG. 1 is a diagram of an exemplary trusted or secured software environment, according to one embodiment of the present disclosure.

Referring now to FIG. 1, a diagram of an exemplary trusted or secured software environment is shown, according to one embodiment of the present invention. In the FIG. 1 embodiment, trusted and untrusted software may be loaded simultaneously and may execute simultaneously on a single computer system, shown as hardware 180. Hardware 180 may include one or more processors, logic to connect the processors to memory or input/output devices (sometimes called a "chipset"), and specific security devices such as a trusted platform module.

A secure virtual machine monitor (SVMM) 150 may selectively permit or prevent direct access to hardware 180 from one or more untrusted operating systems 140 and untrusted applications 110 through 130. In this context, "untrusted" does not necessarily mean that the operating system or applications are deliberately misbehaving, but that the size and variety of interacting code makes it impractical to reliably assert that the software is behaving as desired, and that there are no viruses or other foreign code interfering with its execution. In a typical embodiment, the untrusted code might consist of the normal operating system and applications found on today's personal computers.

SVMM 150 also selectively permits or prevents direct access to hardware 180 from one or more trusted or secure kernels 160 and one or more trusted applications 170. Such a trusted or secure kernel 160 and trusted applications 170 may be limited in size and functionality to aid in the ability to perform trust analysis upon it. The trusted application 170 may be any software code, program, routine, or set of routines which is executable in a secure environment. Thus, the trusted application 170 may be a variety of applications, or code sequences, or may be a relatively small application such as a Java applet.

Instructions or operations normally performed by operating system 140 or kernel 160 that could alter system resource protections or privileges may be trapped by SVMM 150, and selectively permitted, partially permitted, or rejected. As an example, in a typical embodiment, instructions that change the processor's page table that would normally be performed by operating system 140 or kernel 160 would instead be trapped by SVMM 150, which would ensure that the request was not attempting to change page privileges outside the domain of its virtual machine.

The processor or processors within hardware 180 may contain certain special circuits or logic elements to initiate and support secure or trusted operations. For example, a processor may support the execution of special secure mode enter (SENTER) instructions that may initiate trusted operations. When executed, the SENTER instruction may load and initiate the SVMM 150 in a trusted manner, thus initiating trusted operations in a previously untrusted system.

An initiating processor's execution of its SENTER instruction may terminate by transferring execution control to a trusted copy of the system initialization code, which may then perform its system test and configuration actions and may register the memory-resident copy of SVMM 150. Once the trusted system initialization code has completed its execution, the system initialization code may finally transfer the initializing processor's execution control to the SVMM 150. At this time, a secure mode flag may be set true in the processors of hardware 180. In one embodiment, the secure mode flag may be controlled by processor microcode, and may not be visible architecturally. From this point onwards, the overall system may be operating in trusted mode as discussed above.

To leave the trusted mode under the control of the SVMM 150, and thus return to untrusted operations, a secure exit (SEXIT) instruction may be executed. The SEXIT instruction may support the termination of trusted operations and in particular the operation of SVMM 150. At this time, the secure mode flag may be set false in the processors of hardware 180.

Figure 2:
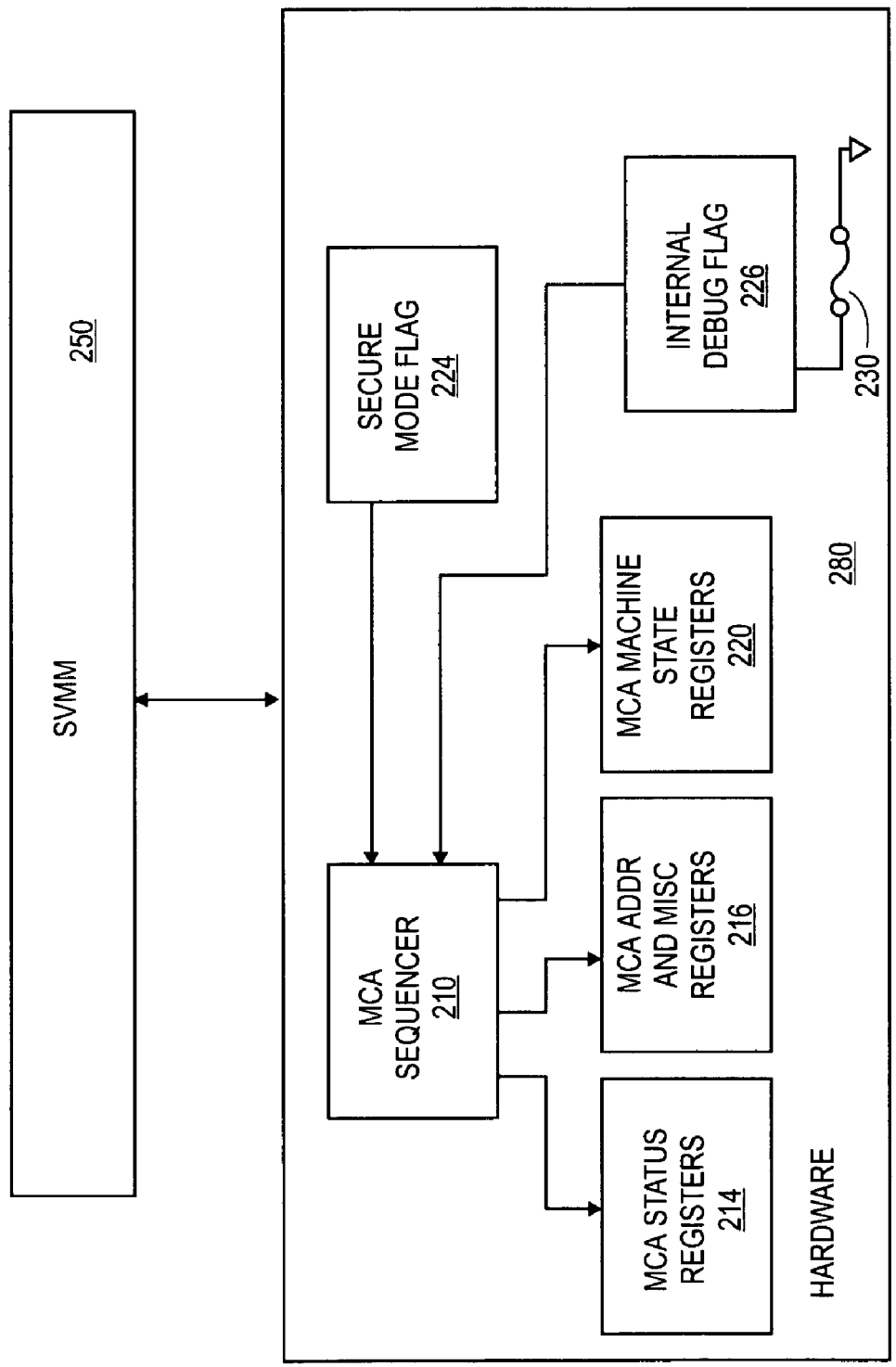
FIG. 2 is a schematic diagram of a machine-check architecture sequencer and registers, according to one embodiment of the present disclosure.

Referring now to FIG. 2, a schematic diagram of a machine-check architecture (MCA) sequencer and MCA registers is shown, according to one embodiment of the present disclosure. Duplicate copies of the MCA sequencer 210 and MCA registers may be located within one or more of the processors within hardware 280. In one embodiment, the MCA sequencer 210 may control the loading of data arising from a hardware error into the MCA registers. The MCA sequencer 210 may in some circumstances load error status data into a set of MCA status registers 214, error address and other optional miscellaneous data into a set of MCA address and miscellaneous registers 216, and a set of machine state data into a set of MCA machine state registers 220. The MCA status registers 214, MCA address and miscellaneous registers 216, and MCA machine state registers 220 may preserve their data through various system events. In various embodiments, these registers may have differing degrees of non-volatility. In one embodiment, the data in these registers may be preserved following a soft reset event, which may include a local soft reset following the assertion of a signal on the INIT# signal pin of a Pentium® compatible processor, or a global soft reset following the assertion of a signal on the RESET# signal pin of a Pentium® compatible processor. However, in one embodiment the data in these registers may not necessarily be preserved following a hardware reset, which may include turning the power-supply off then on, or de-asserting a signal on the PWRGOOD signal pin of a Pentium® compatible processor.

The MCA sequencer 210 may be implemented in several differing ways in differing embodiments. In one embodiment, the MCA sequencer 210 may be implemented as a hardware state machine. In other embodiments, MCA sequencer 210 may be implemented as fixed function hardware logic or as processor microcode, or as a combination of fixed function hardware logic and processor microcode. Still other embodiments may implement MCA sequencer 210 by executing processor-trusted software or firmware code that may be stored outside the processors of hardware 280.

Hardware 280 may include a secure mode flag 224. This secure mode flag 224 may be similar to that discussed above in connection with FIG. 1, where it was located in processor hardware and controlled by the microcode of security instructions. In other embodiments, it may be a software flag, or it may be a hardware flag within a chipset. MCA sequencer 210 may examine the value (true or false) of secure mode flag 224, and then either update or not update selected information relevant to an error condition into the MCA registers based upon the value found there. In one embodiment, when the secure mode flag is false, the MCA sequencer 210 may proceed to load error status data into a set of MCA status registers 214, error address and other optional miscellaneous data into a set of MCA address and miscellaneous registers 216, and a set of machine state data into a set of MCA machine state registers 220.

However, when the secure mode flag is true, the MCA sequencer 210 may still load error status data into a set of MCA status registers 214, error address and other optional miscellaneous data into a set of MCA address and miscellaneous registers 216, but either inhibit loading or mark as invalid a set of machine state data into a set of MCA machine state registers 220. In this manner, error status data that is unlikely to contain security sensitive content, such as what type of error, at which address a memory error was generated, and other similar error status data, may still be placed into the appropriate MCA registers to aid in future debugging. At the same time, the machine state data, which may include such items as the contents of general purpose registers, the instruction pointer, and arithmetic flags, may not be loaded as valid data into the MCA machine state registers. Because the MCA machine state registers may be examined by untrusted software, this would prevent the disclosure of sensitive information if the general purpose registers contained items such as encryption keys, copies of both clear text and encrypted text, credit card numbers, social security numbers, and other kinds of sensitive data.

In some embodiments, the processors in hardware 280 may also include an internal debug flag 226. This internal debug flag 226 may be set (value true) at the time of manufacture of the processor, and cleared at the time of one or more defined events. In one embodiment, these defined events may include a final test or a final manufacturing step, or at the time of release of inventory product to a customer. In one embodiment, a fuse 230 may be blown during this defined event to clear (value false) the flag. In other embodiments, other methods may be used to set and clear the internal debug flag. The internal debug flag 226 may be used to enable certain test and debugging functionality for the processor manufacturer that should not normally be available to the end user of the processor.

In one embodiment, MCA sequencer 210 may also examine the value of the internal debug flag 226. In the cases where the secure mode flag 224 has value false, the value of the internal debug flag 226 would not matter, and the MCA sequencer 210 may proceed to load error status data into a set of MCA status registers 214, error address and other optional miscellaneous data into a set of MCA address and miscellaneous registers 216, and a set of machine state data into a set of MCA machine state registers 220.

In the cases where the secure mode flag 224 has value true, the value of the internal debug flag 226 would matter. When the internal debug flag 226 has value true, then the MCA sequencer 210 may override the status of the secure mode flag 224. In this case, the MCA sequencer 210 may proceed to load error status data into a set of MCA status registers 214, error address and other optional miscellaneous data into a set of MCA address and miscellaneous registers 216, and a set of machine state data into a set of MCA machine state registers 220. When the internal debug flag 226 has value false, then the MCA sequencer 210 may not override the status of the secure mode flag 224. In this case, the MCA sequencer 210 may still load error status data into a set of MCA status registers 214, error address and other optional miscellaneous data into a set of MCA address and miscellaneous registers 216, but then inhibit loading and mark as invalid a set of machine state data into a set of MCA machine state registers 220.

Referring now to FIG. 3A, a diagram of a machine-check architecture status (MCA) register 300 is shown, according to one embodiment of the present disclosure. In other embodiments, other forms of error reporting status registers may be used. The MCA architectural status register 300 may be one of several included in MCA status registers 214 of FIG. 2. In one embodiment, there may be several such MCA architectural status registers, one for each hardware unit covered. Such hardware units may be the cache, execution unit, bus interface, and other such functional units of the processor. Here the MCA architectural status register 300 is labeled as the i'th register among several.

MCA architectural status register 300 may include an MCA error code field to specify the standard error codes, a model-specific error code field to specify the error codes specific to that processor's family, and a number of flag bits. Such flag bits may include a VAL bit to indicate whether the contents of the register are valid, an OVER bit to indicate that a machine-check error occurred while the results of a previous error were still in the register, a UC bit to indicate whether the processor was able to correct the error, and an EN bit to indicate that the error was enabled by a bit in a separate control register (not shown). A pair of flag bits, MISCV and ADDRV, may show if the data in the miscellaneous data register and error address registers, respectively, are valid. These miscellaneous data and error address registers may be included in the MCA address and miscellaneous registers 216 of FIG. 2. Finally, a processor context corrupt (PCC) flag bit may indicate that the state of the processor potentially may have been corrupted by the particular error condition, and that reliable restarting of the processor may not be possible.

Referring now to FIG. 3B, a diagram of a machine-check architecture (MCA) address register 340 is shown, according to one embodiment of the present disclosure. The MCA address register 340 may be one of several included in MCA address and miscellaneous registers 216 of FIG. 2. In one embodiment, there may be several such MCA address registers, one for each hardware unit covered. Such hardware units may be the cache, execution unit, bus interface, and other such functional units of the processor. Here the MCA address register 340 is labeled as the i'th register among several. MCA address register 340 may contain an address field to contain the address of the code or data memory location that produced the machine-check error. This MCA address register 340 may either be not implemented or contain no address when the ADDRV bit of the corresponding i'th architectural status register is clear (value false).

Referring now to FIG. 4, a diagram of a set of machine-check architecture state registers is shown, according to one embodiment of the present disclosure. In one embodiment, the state of the named extended registers of a Pentium®-class compatible processor at the time of the error may be saved in state registers 410 through 438. Additionally the state of the arithmetic flag EFLAGS register may be saved in state register 442. Finally, the state of the extended instruction pointer (EIP) may be saved in state register 446.

In one embodiment, the set of machine-check architecture state registers may include one or more miscellaneous state registers 450. In one embodiment, the miscellaneous state register 450 may contain indications of a page assist or page fault. In addition, the miscellaneous state register 450 may also include a microcode instruction pointer. In one embodiment, the MCA sequencer 210 of FIG. 2 may use the miscellaneous state register 450 to mark the contents of MCA machine state registers 220 as invalid. This may be done by placing an invalid combination of bits, such as all "ones", into all or a portion of miscellaneous state register 450. In one embodiment, the microcode instruction pointer within miscellaneous state register 450 may be written as all "ones" to mark the contents of MCA machine state registers 220 as invalid. In other embodiments, other portions of miscellaneous state register 450 may be used.

Figure 5:
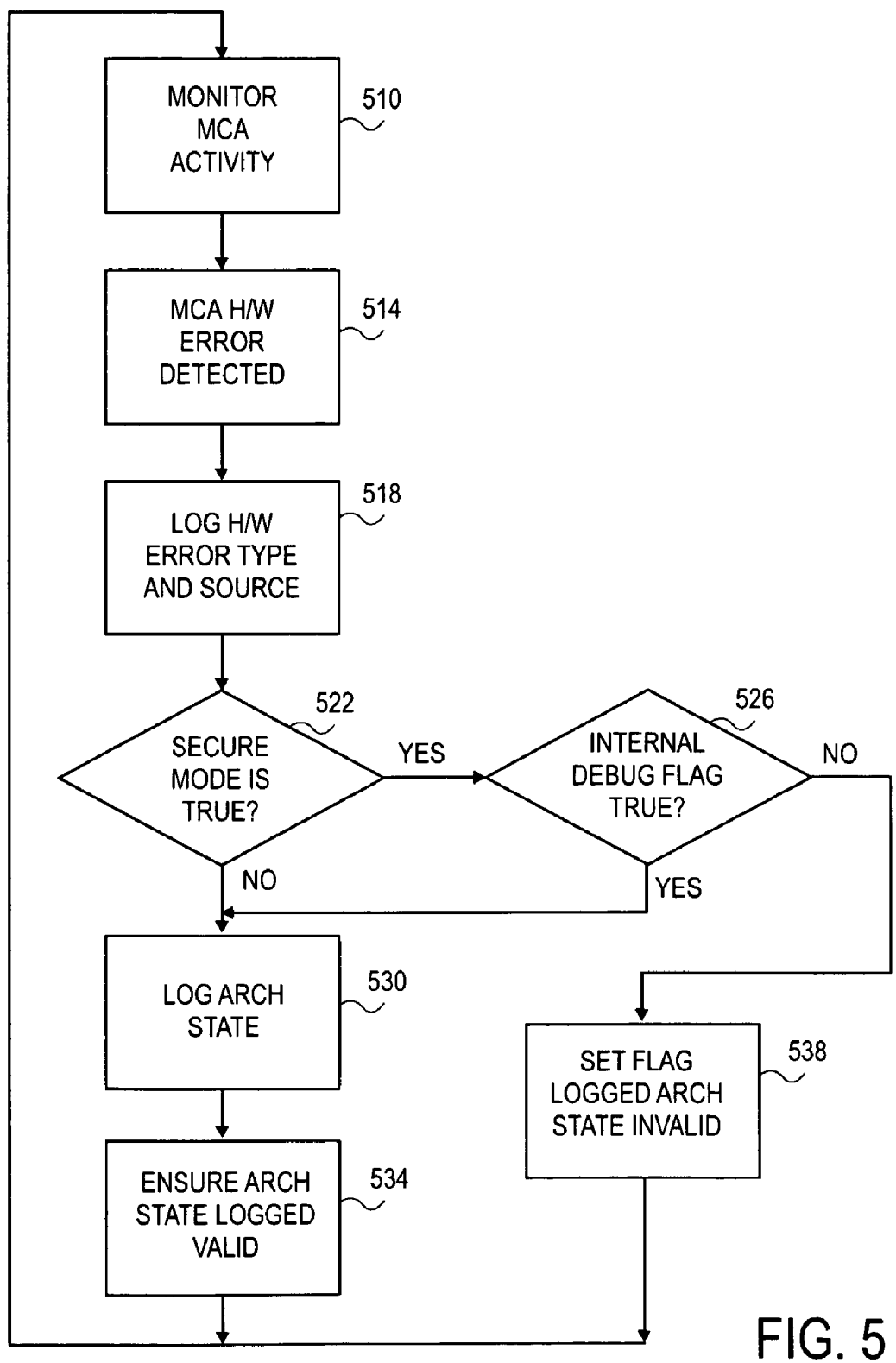
FIG. 5 is a flowchart of the operation of a sequencer, according to one embodiment of the present disclosure.

Referring now to FIG. 5 a flowchart of the operation of a sequencer is shown, according to one embodiment of the present disclosure. The sequencer may be implemented in several differing ways in differing embodiments. In one embodiment, the sequencer may be implemented as a hardware state machine. In other embodiments, the sequencer may be implemented as fixed function hardware logic or as processor microcode, or as a combination of fixed function hardware logic and processor microcode. Still other embodiments may implement the sequencer by executing processor-trusted software or firmware code that may be stored outside the processors.

In block 510, the process monitors the MCA activity, looking for the occurrence of errors. In block 514, such an error is detected. Then in block 518 the sequencer may log the hardware error type and source. In one embodiment, this may be performed by writing one or more error codes into a status register and also by writing the address of the code or data memory location that produced the error.

In decision block 522, it may be determined whether the secure mode flag is true. If the answer is no, then the process may exit decision block 522 along the NO path. Then in block 530, the sequencer may log the architectural state of the processor. In one embodiment, this may be performed by writing the contents of the general purpose registers, instruction pointer, and other architectural state variables into a set of machine state registers. In block 534, the sequencer may then ensure that the architectural state registers are indicated as valid. In one embodiment, this may be performed in part by ensuring that the contents of a portion of a miscellaneous state register are a valid combination of bits.

Returning to decision block 522, if the answer is yes, then the process may exit decision block 522 along the YES path. In one embodiment, the process then enters optional decision block 526, while in another embodiment the process directly enters block 538. If decision block 526 is present, then in decision block 526 it may be determined whether an internal debug flag is true. If so, then the process exits decision block 526 along the YES path, and enters block 530. If not, then the process exits decision block 526 along the NO path and enters block 538. In block 538, the architectural state may be prevented from being logged, or may be flagged as being invalid. In one embodiment, this may be performed in part by setting the contents of a portion of a miscellaneous state register to an invalid combination of bits. In one embodiment, the invalid combination of bits may be all "ones".

Figure 6A:
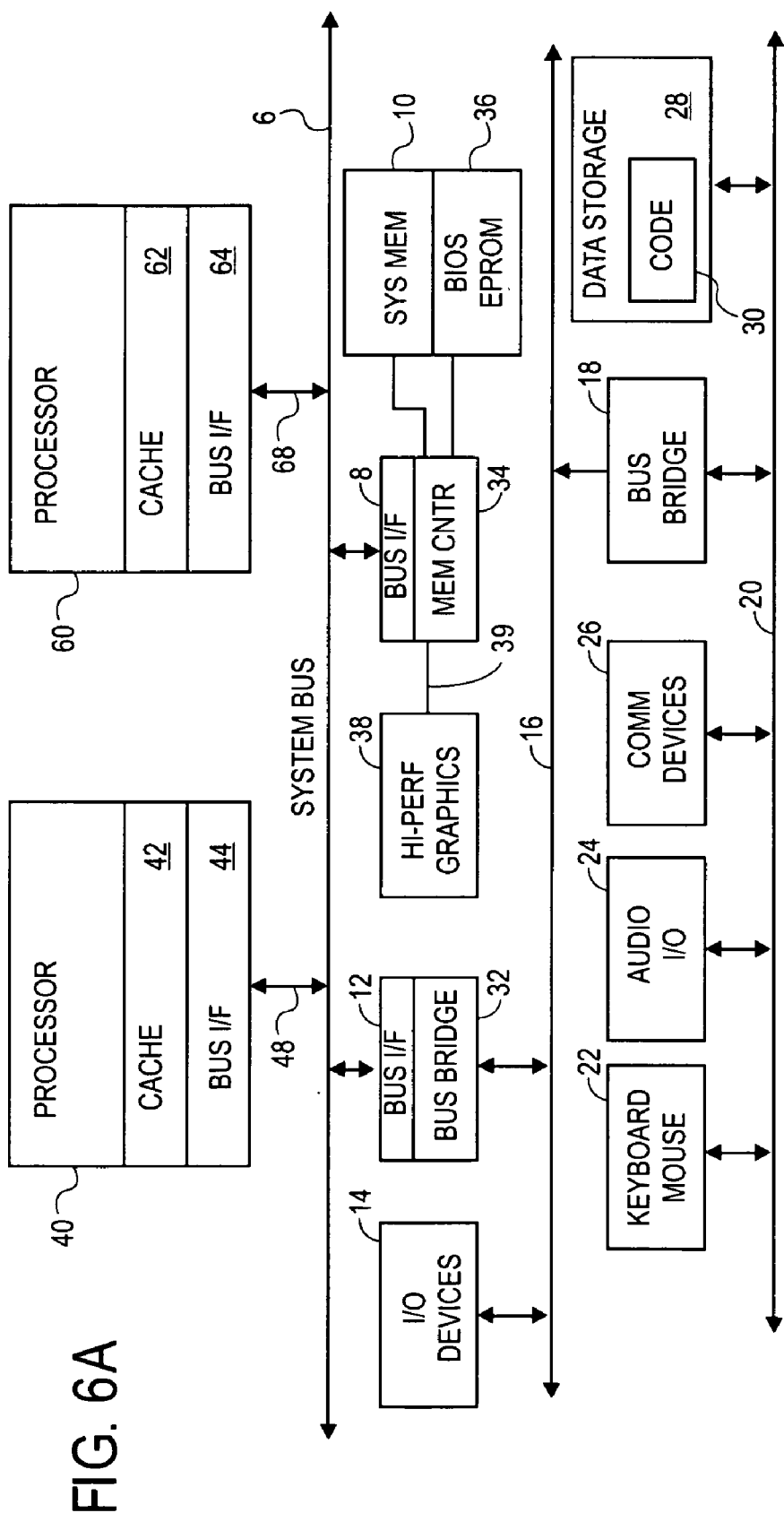
FIG. 6A is a schematic diagram of a system including processors with machine-check architecture sequencers, according to an embodiment of the present disclosure.
Figure 6B:
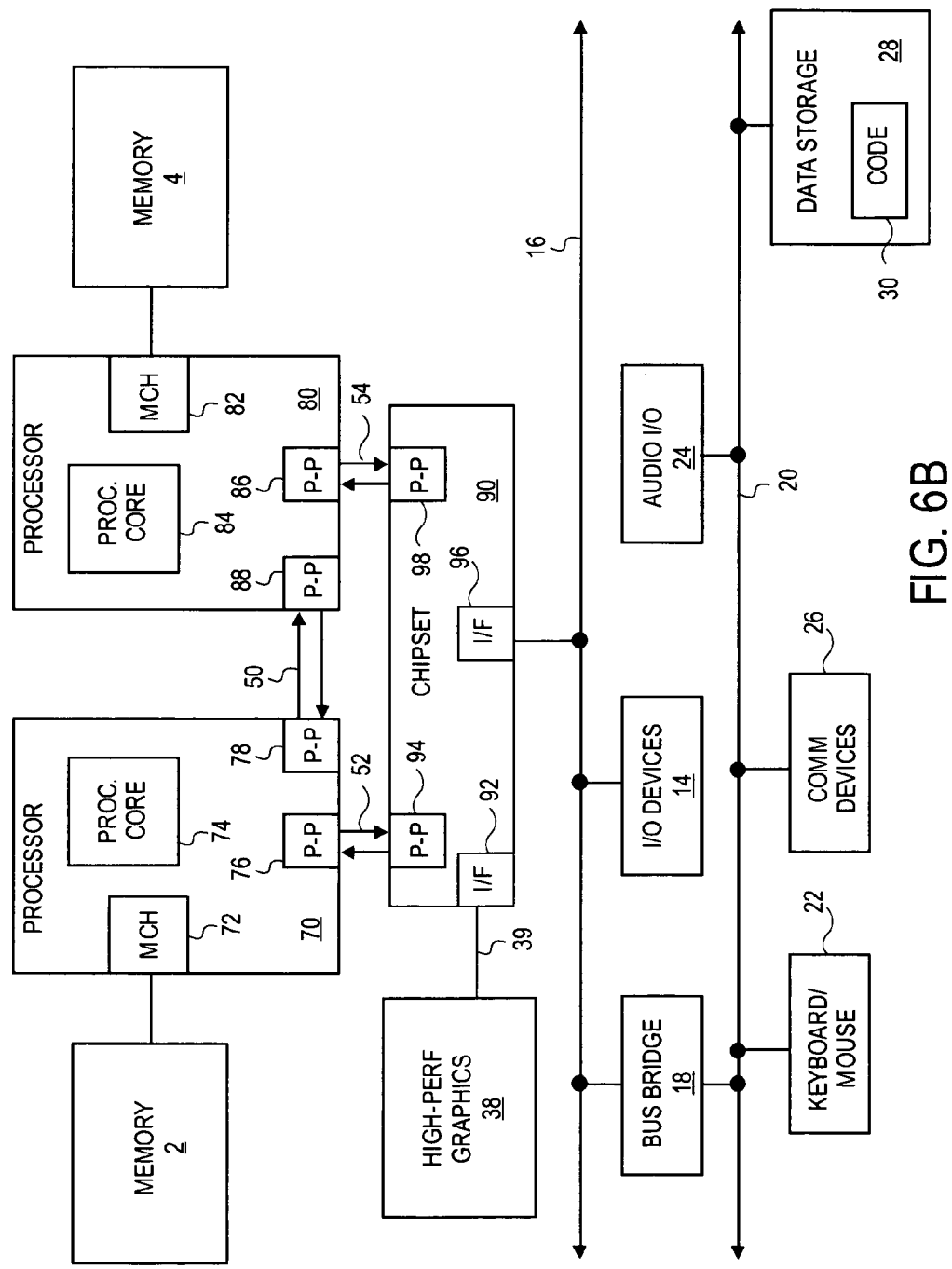
FIG. 6B is a schematic diagram of a system including processors with machine-check architecture sequencers, according to another embodiment of the present disclosure.

Referring now to FIGS. 6A and 6B, schematic diagrams of systems including processors with machine-check architecture sequencers are shown, according to two embodiments of the present disclosure. The FIG. 6A system generally shows a system where processors, memory, and input/output devices are interconnected by a system bus, whereas the FIG. 6B system generally shows a system where processors, memory, and input/output devices are interconnected by a number of point-to-point interfaces.

The FIG. 6A system may include one or several processors, of which only two, processors 40, 60 are here shown for clarity. Processors 40, 60 may include level one caches 42, 62. The FIG. 6A system may have several functions connected via bus interfaces 44, 64, 12, 8 with a system bus 6. In one embodiment, system bus 6 may be the front side bus (FSB) utilized with Pentium® class microprocessors manufactured by Intel® Corporation. In other embodiments, other busses may be used. In some embodiments memory controller 34 and bus bridge 32 may collectively be referred to as a chipset. In some embodiments, functions of a chipset may be divided among physical chips differently than as shown in the FIG. 6A embodiment.

Memory controller 34 may permit processors 40, 60 to read and write from system memory 10 and from a basic input/output system (BIOS) erasable programmable read-only memory (EPROM) 36. In some embodiments BIOS EPROM 36 may utilize flash memory. Memory controller 34 may include a bus interface 8 to permit memory read and write data to be carried to and from bus agents on system bus 6. Memory controller 34 may also connect with a high-performance graphics circuit 38 across a high-performance graphics interface 39. In certain embodiments the high-performance graphics interface 39 may be an advanced graphics port AGP interface. Memory controller 34 may direct data from system memory 10 to the high-performance graphics circuit 38 across high-performance graphics interface 39.

The FIG. 6B system may also include one or several processors, of which only two, processors 70, 80 are shown for clarity. Processors 70, 80 may each include a local memory controller hub (MCH) 72, 82 to connect with memory 2, 4. Processors 70, 80 may exchange data via a point-to-point interface 50 using point-to-point interface circuits 78, 88. Processors 70, 80 may each exchange data with a chipset 90 via individual point-to-point interfaces 52, 54 using point to point interface circuits 76, 94, 86, 98. Chipset 90 may also exchange data with a high-performance graphics circuit 38 via a high-performance graphics interface 92.

In the FIG. 6A system, bus bridge 32 may permit data exchanges between system bus 6 and bus 16, which may in some embodiments be a industry standard architecture (ISA) bus or a peripheral component interconnect (PCI) bus. In the FIG. 6B system, chipset 90 may exchange data with a bus 16 via a bus interface 96. In either system, there may be various input/output I/O devices 14 on the bus 16, including in some embodiments low performance graphics controllers, video controllers, and networking controllers. Another bus bridge 18 may in some embodiments be used to permit data exchanges between bus 16 and bus 20. Bus 20 may in some embodiments be a small computer system interface (SCSI) bus, an integrated drive electronics (IDE) bus, or a universal serial bus (USB) bus. Additional I/O devices may be connected with bus 20. These may include keyboard and cursor control devices 22, including mice, audio I/O 24, communications devices 26, including modems and network interfaces, and data storage devices 28. Software code 30 may be stored on data storage device 28. In some embodiments, data storage device 28 may be a fixed magnetic disk, a floppy disk drive, an optical disk drive, a magneto-optical disk drive, a magnetic tape, or non-volatile memory including flash memory.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
   a secure mode flag to indicate a processor is operating in a trusted mode; and
   a hardware error reporting system to detect and report a hardware error, including
      a machine state register to store machine state when said hardware error is detected; and
      a sequencer to mark said machine state register invalid when said secure mode flag is true.

2. The apparatus of claim 1, wherein said sequencer to mark said machine state register invalid by setting a validity bit for said machine state register.

3. The apparatus of claim 1, wherein said sequencer to mark said machine state register invalid by setting a portion of a miscellaneous state register of said machine state register to an invalid number.

4. The apparatus of claim 1, wherein said sequencer to load machine state data into said machine state register when said secure mode flag is false.

5. The apparatus of claim 4, wherein said sequencer to ensure said machine state register is not marked invalid when said secure mode flag is false.

6. The apparatus of claim 1, further comprising an internal debug flag, wherein said sequencer to mark a machine state register invalid when said internal debug flag is false and said secure mode flag is true.

7. The apparatus of claim 6, wherein said sequencer to load machine state data into said machine state register when said internal debug flag is true regardless of said secure mode flag.

8. The apparatus of claim 1, wherein said sequencer to load machine error status data into a machine error status register regardless of value of said secure mode flag.

9. The apparatus of claim 1, wherein said secure mode flag is set by execution of a secure mode enter instruction.

10. A method, comprising:
   detecting a machine error;

in response to detecting said machine error, determining a first value of a secure mode flag; and in response to determining that said first value is true, marking a machine state register invalid.

11. The method of claim 10, wherein said marking includes setting a validity bit for said machine state register.

12. The method of claim 10, wherein said marking includes setting a portion of a miscellaneous state register of said machine state register to an invalid number.

13. The method of claim 10, further comprising loading machine state data into said machine state register when said first value is false.

14. The method of claim 13, further comprising ensuring said machine state register is not marked invalid when said first value is false.

15. The method of claim 10, wherein said marking includes marking said machine state register invalid when a second value of an internal debug flag is false and said first value of said secure mode flag is true.

16. The method of claim 15, further comprising loading machine state data into said machine state register when said second value is true even when said first value of said secure mode flag is true.

17. The method of claim 10, further comprising loading machine error status data into a machine error status register regardless of value of said first value.

18. The method of claim 10, further comprising setting said first value by executing a secure mode enter instruction.

19. A system, comprising:
a processor including a secure mode flag to indicate a processor is operating in a trusted mode, and a hardware error reporting system to detect and report a hardware error, including a machine state register to store machine state when said hardware error is detected and a sequencer to mark said machine state register invalid when said secure mode flag is true;
a system interconnect interface; and
an audio input/output logic.

20. The system of claim 19, wherein said sequencer to mark said machine state register invalid by setting a validity bit for said machine state register.

21. The system of claim 19, wherein said sequencer to mark said machine state register invalid by setting a portion of a miscellaneous state register of said machine state register to an invalid number.

22. The system of claim 19, wherein said sequencer to load machine state data into said machine state register when said secure mode flag is false.

23. The system of claim 22, wherein said sequencer to ensure said machine state register is not marked invalid when said secure mode flag is false.

24. The system of claim 19, wherein said sequencer to load machine error status data into a machine error status register regardless of value of said secure mode flag.

25. The system of claim 19, wherein said secure mode flag is set by execution of a secure mode enter instruction.

26. A computer readable media, containing a program executable by a machine to perform the process comprising:
detecting a machine error;
in response to detecting said machine error, determining a first value of a secure mode flag; and
in response to determining that said first value is true, marking a machine state register invalid.

27. The computer readable media of claim 26, wherein said marking includes setting a validity bit for said machine state register.

28. The computer readable media of claim 26, wherein said marking includes setting a portion of a miscellaneous state register of said machine state register to an invalid number.

29. The computer readable media of claim 26, further comprising loading machine state data into said machine state register when said first value is false.

30. The computer readable media of claim 29, further comprising ensuring said machine state register is not marked invalid when said first value is false.

31. The computer readable media of claim 26, wherein said marking includes marking said machine state register invalid when a second value of an internal debug flag is false and said first value of said secure mode flag is true.

32. The computer readable media of claim 31, further comprising loading machine state data into said machine state register when said second value is true even when said first value of said secure mode flag is true.

33. The computer readable media of claim 26, further comprising loading machine error status data into a machine error status register regardless of value of said first value.

34. The computer readable media of claim 26, further comprising setting said first value by executing a secure mode enter instruction.

* * * * *